(12) United States Patent
Zheng et al.

(10) Patent No.: US 10,964,054 B2
(45) Date of Patent: Mar. 30, 2021

(54) METHOD AND DEVICE FOR POSITIONING

(71) Applicant: BAIDU ONLINE NETWORK TECHNOLOGY (BEIJING) CO., LTD., Beijing (CN)

(72) Inventors: Jingsen Zheng, Beijing (CN); Shichun Yi, Beijing (CN); Xiaolong Yang, Beijing (CN); Shiyu Song, Beijing (CN); Fangfang Dong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 70 days.

(21) Appl. No.: 16/357,571

(22) Filed: Mar. 19, 2019

(65) Prior Publication Data
US 2019/0378296 A1 Dec. 12, 2019

(30) Foreign Application Priority Data

Jun. 11, 2018 (CN) .......................... 201810597963.2

(51) Int. Cl.
*G06T 7/00* (2017.01)
*G06T 7/73* (2017.01)
*G01C 21/32* (2006.01)

(52) U.S. Cl.
CPC ................ *G06T 7/74* (2017.01); *G01C 21/32* (2013.01); *G06T 2207/30244* (2013.01); *G06T 2207/30252* (2013.01)

(58) Field of Classification Search
CPC ............. G06T 7/74; G06T 2207/30244; G06T 2207/30252; G01C 21/32
See application file for complete search history.

(56) References Cited

U.S. PATENT DOCUMENTS

2016/0185355 A1* 6/2016 Yamaguchi ........ G01C 21/3602
348/142
2017/0016740 A1* 1/2017 Cui .................... G06K 9/00671
(Continued)

FOREIGN PATENT DOCUMENTS

CN 102053249 A 5/2011
CN 102760310 A 10/2012
(Continued)

OTHER PUBLICATIONS

European Patent Application No. 19163591.1 partial Search Report and Opinion dated Oct. 14, 2019, 11 pages.
(Continued)

*Primary Examiner* — Ping Y Hsieh
(74) *Attorney, Agent, or Firm* — Lathrop GPM LLP

(57) ABSTRACT

The present disclosure provides a method and a device for positioning, an apparatus and a computer readable storage medium. The method includes acquiring a visual feature map of a geographic area located by a movable object. The visual feature map includes a first set of visual features. The method further includes acquiring at least one image captured by a camera coupled to the movable object during a motion of the movable object within the geographic area. The method further includes extracting a second set of visual features corresponding to the first set of visual features from the at least one image. In addition, the method further includes determining at least one pose of the movable object during the motion at least based on the visual feature map and the second set of visual features.

16 Claims, 7 Drawing Sheets

(56) References Cited

U.S. PATENT DOCUMENTS

2018/0031375 A1* 2/2018 Deng .................. G01S 17/89
2018/0086133 A1* 3/2018 Ito .................... B43K 15/00

FOREIGN PATENT DOCUMENTS

| CN | 105652871 A | 6/2016 |
|---|---|---|
| CN | 106840179 A | 6/2017 |
| CN | 107339996 A | 11/2017 |
| CN | 107478214 A | 12/2017 |
| CN | 107808395 A | 3/2018 |
| EP | 3029538 A1 | 6/2016 |
| JP | 2011511281 A | 4/2011 |
| WO | WO 2015015939 A1 | 2/2015 |
| WO | WO2016/146641 A1 * | 9/2016 |
| WO | WO 2016146641 A1 | 9/2016 |
| WO | WO 2018086133 A1 | 5/2018 |

OTHER PUBLICATIONS

European Patent Application No. 19163591.1 extended Search Report and Opinion dated Feb. 4, 2020, 10 pages.
Chinese Patent Application No. 201810597963.2 Office Action dated Mar. 20, 2020, 21 pages.
Chinese Patent Application No. 201810597963.2 English translation of Office Action dated Mar. 20, 2020, 26 pages.
Japanese Patent Application No. 2019-059645 First Office Action dated May 19, 2020, 3 pages.
Japanese Patent Application No. 2019-059645 English translation of First Office Action dated May 19, 2020, 3 pages.

* cited by examiner

METHOD AND DEVICE FOR POSITIONING

CROSS-REFERENCE TO RELATED APPLICATION

This application claims priority to Chinese Application No. 201810597963.2, filed on Jun. 11, 2018, the entire content of which is incorporated herein by reference.

TECHNICAL FIELD

The present disclosure relates to the field of positioning, and more particular, to a method and a device for positioning, an apparatus and a computer readable storage medium.

BACKGROUND

High-precision positioning technology is an important part of autonomous vehicle technology and is a basis of path planning, control decision and perception via the autonomous vehicle. There exist several conventional positioning methods, such as, GPS (Global Position System)/IMU (Inertial Measurement Unit)-based positioning method, radar-based positioning method, and camera-based positioning method.

SUMMARY

According to exemplary embodiments of the present disclosure, technical solutions for positioning are provided.

In one embodiment of the present disclosure, a method for positioning is provided. The method includes: acquiring a visual feature map of a geographic area located by a movable object, the visual feature map comprising a first set of visual features, and the first set of visual features comprising a first visual feature perpendicular to a road surface of the geographic area; acquiring at least one image captured by a camera coupled to the movable object during a motion of the movable object within the geographic area; extracting a second set of visual features corresponding to the first set of visual feature features from the at least one image; and determining at least one pose of the movable object during the motion, at least based on the visual feature map and the second set of visual features.

In the present disclosure, there is further provided an electronic device. The electronic device includes one or more processors and a storage device. The storage device is configured to store one or more programs. When the one or more programs are executed by the one or more processors, a method according to the first aspect of the present disclosure is executed by the one or more processors.

In the present disclosure, there is further provided a computer readable medium. The computer readable medium has computer programs stored thereon. When the computer programs are executed by a processor, a method according to the first aspect of the present disclosure is executed.

It is to be understood that, the disclosure of the summary is not intended to limit the important or essential features of embodiments or limit the scope of the present disclosure. Other features of the present disclosure will be readily understood by the following description.

BRIEF DESCRIPTION OF THE DRAWINGS

The above and other features, advantages and aspects of various embodiments of the present disclosure will become more apparent in combination with drawings and referring to following drawings. In the drawings, same or similar reference numerals indicate same or similar elements, in which.

DETAILED DESCRIPTION

Figure 1:
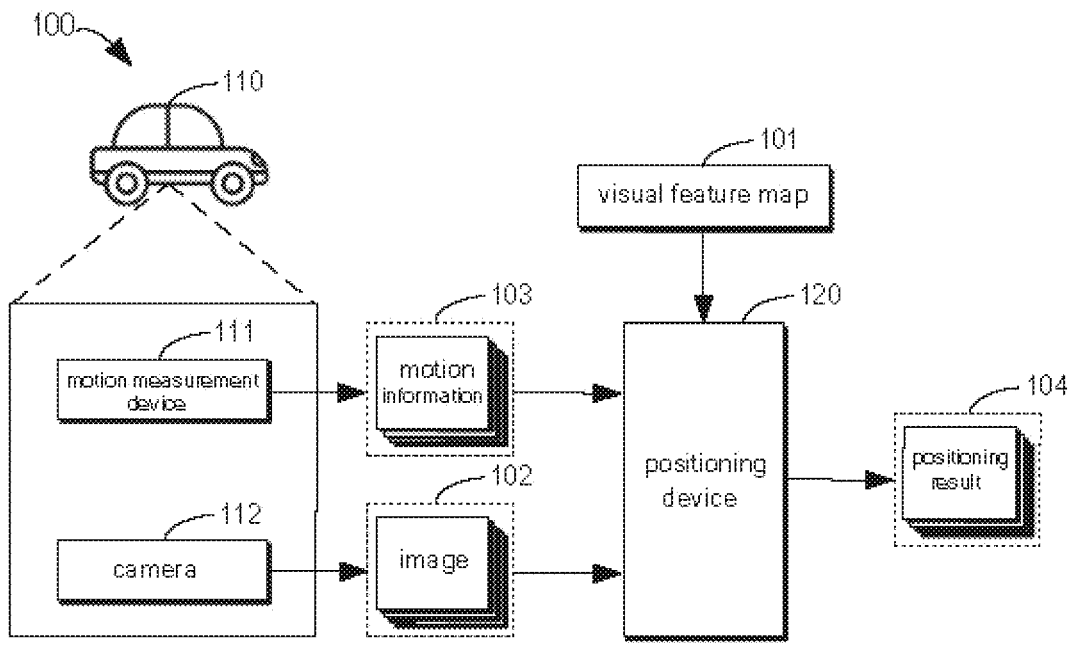
FIG. 1 is a schematic diagram illustrating an exemplary environment for implementing embodiments of the present disclosure.

Embodiments of the present disclosure will be described in more detail below with reference to the drawings. Although some embodiments of the present disclosure are shown in the drawings, it should be understood that the present disclosure may be embodied in various forms and should not be construed as limited to the embodiments set forth herein. Instead, the embodiments set forth herein are used to more completely understand the present disclosure. It should be understood that, the drawings and embodiments of the present disclosure are to be considered as illustrative only and not limiting the scope of the present disclosure.

In the description of the present disclosure, the term "comprises" and equivalent terms should be understood as open-ended, i.e., "comprising but not limited to". The term "based on" should be understood as "based at least in part". The term "one embodiment" or "an embodiment" should be taken as "at least one embodiment." The terms "first," "second," and the like may refer to different or identical objects. Other explicit and implicit definitions may also be included below.

As mentioned above, high-precision positioning technology is desired to satisfy the requirements of the autonomous vehicle. Conventionally, there may be a GPS (Global Position System)/IMU (Inertial Measurement Unit)-based positioning method, a radar-based positioning method, and a camera-based positioning method.

The GPS/IMU-based positioning method may provide a high-precision positioning service in a case of good GPS signals. However, there may be a large number of scenes in the real road that has poor GPS signals or weak GPS signals, resulting in a rapid accumulation of errors in this method. It is impossible to achieve stable and high-precision positioning. The radar-based method may accurately measure the position and depth of each location using radar, and thus may achieve high-precision positioning through matching with a point cloud map. However, the radar itself is expensive and thus may not be widely used. In addition, the point cloud map has a short update cycle and high maintenance cost. The camera-based positioning method generally determines a relative pose between a previous frame and a current frame by matching feature points of the images, to estimate a pose by optimizing a preset objective function. However, due to illumination and viewing angle, the features obtained by those above methods may be not stable and there is an accumulated error, which may not satisfy a requirement of high-precision positioning of the autonomous vehicle.

According to embodiments of the present disclosure, there is provided a technical solution for positioning. The technical solution relates to an estimation of a relative motion between different moments of an object via a motion measure device coupled to the object. Therefore, the pose of the object at a current moment may be determined based on the relative motion and the pose at a previous moment. Visual features detected in an image captured at the current moment may be matched with the visual features contained in the visual feature map and corresponding to a predicted current pose, to determine a final pose of the object at the current moment. This technical solution may be suitable to a scene having no GPS signal or a poor GPS signal, and may realize high-precision positioning, thereby satisfying a requirement of high-precision positioning of a L4 level autonomous vehicle at a lower cost.

Below, embodiments of the present disclosure will be described with reference to drawings. In the description of the present disclosure, the term "pose" refers to a location and a gesture of the object in a particular coordinate system. For example, in a two-dimensional coordinate system, the pose of the object may be denoted by a two-dimension coordinate and a heading angle. In a third-dimensional coordinate system, the pose of the object may be denoted by a three-dimensional coordinate, a pitch angle, a heading angle, and a rotation angle. Hereinafter, embodiments of the present disclosure will be discussed taking the pose in a two-dimensional coordinate system as an example. However, it should be understood that this is for the purpose of illustration only, and is not intended to limit the scope of the disclosure. Embodiments of the present disclosure may also be applied to, for example, the pose in a three-dimensional coordinate system. Moreover, the term "movable object" refers to a transport tool or other object to be positioned. Hereinafter, a vehicle in motion will be taken as an example of a movable object. However, it should be understood that this is for the purpose of illustration only, and is not intended to limit the scope of the disclosure. Embodiments of the present disclosure may also be similarly applied to other movable objects such as an aircraft or the like.

FIG. 1 is a schematic diagram illustrating an exemplary environment 100 for implementing embodiments of the present disclosure. The environment 100 may include a movable object 110 and a positioning device 120. Although the positioning device 120 is illustrated to be separated from the movable object 110 in FIG. 1, this is only for the purpose of exemplary. In some embodiments, the positioning device 120 may also be included in the moveable object 110. For example, when the movable object 110 is an autonomous vehicle, the positioning device 120 may be a computing device of the vehicle. It should be understood that, FIG. 1 merely illustrates a structure and function of the environment 100 by ways of example, instead implying a limitation of the scope of the present disclosure. Embodiments of the present disclosure may further be applied to another environment having a different structure and/or function.

The positioning device 120 is configured to determine a pose of the moveable object 100 during motion. As illustrated in FIG. 1, the positioning device 120 may acquire a visual feature map 101 of a geographical area located by the movable object 110. The term "visual feature" used herein indicates a certain object visually viewed, and the term "visual feature map" indicates a map related to information (e.g., a position and coordinates of a starting point) of the visual features within the geographical area. In some embodiments, the visual feature map 101 may be generated from a point cloud map (which may be described with reference to FIG. 3), and may be stored in a storage medium (not illustrated in FIG. 1) coupled to the positioning device 120 or remoted from the positioning device 120 in a form of grid. The positioning device 120 may acquire the visual feature map 101 from the storage device for storing the visual feature map 101.

The visual feature map 101 may include a set of visual features (also referred to as a first set of visual features). Taking requirements on stability and reliability of high-precision positioning into account, it is required that the first set of visual features included in the visual feature map 101 has enough robustness to be detected reliably under various illumination and weather conditions, and to provide enough positioning constraints.

In some embodiments, the first set of visual features may include a first visual feature perpendicular to a road surface. For example, an example of the first visual feature may include, but not limited to, a columnar object, such as a streetlight, a wire pole, a traffic sign, and the like, perpendicular to the road surface. Additionally or alternatively, the first set of visual features may further include a second visual feature contained on the road surface. For example, an example of the second visual feature may include, but not limited to, various road marking lines, such as lane lines. These columnar or line-shaped visual features may be reliably detected under various illumination and weather conditions, thereby providing enough positioning constraints.

The first set of visual features may be represented in the visual feature map 101 in a form of solid line or dotted line. For example, a position and a coordinate of a starting position of a line segment indicating a respective visual feature may be represented on the visual feature map 101. The visual feature, such as the lane line, being represented in the form of dotted line may provide additional benefits. For example, with the motion of the moveable object 110, the lane line represented by the dotted line is variable, and more positioning constraints may be provided for the movable object 110.

As illustrated in FIG. 1, a motion measurement device 111 and a camera 112 may be mounted on the movable object 110. The "motion measurement device" used herein may indicate any sensor or measurement device for obtaining information related to the motion of the movable object 110, including but not limited to an IMU (Inertial Measurement Unit), such as an accelerator, a gyroscope, and a velocity sensors, such as a wheel velocityometer. The "camera" used herein may include camera, a high-precision camera, a panoramic cameras, a monocular camera for capturing an image.

When the movable object 110 is moving within the geographic area, the motion measurement device 111 may measure the information 103 related to the motion of the movable object 110. The motion information 103 for example may include, but not limited to, angular velocity, velocity (e.g. wheel velocity), accelerate of the movable object 110. The camera 120 may capture at least one image 102 while the movable object 110 is moving. For example, the at least one image 102 captured may include a second set of visual features corresponding to the first set of visual features in the visual feature map 101.

In some embodiments, the second set of visual features may include a third visual feature (i.e., visual feature perpendicular to the road surface) corresponding to the first visual feature. For example, an example of the third visual feature may include, but not limited to, a columnar object perpendicular to the road surface, such as a streetlight, a wire pole, a traffic sign or the like. Additionally or alternatively, the second set of visual features may further include a fourth visual feature (i.e., visual feature contained on the road surface) corresponding to the second visual feature. For example, an example of the fourth visual feature may include, but not limited to, various road marking lines, such as lane lines.

The positioning device 120 may acquire the motion information 130 and the image 102, and may determine a pose of the movable object 110 based on the visual feature map 101, the image 102 and the motion information 103. In some embodiments, the positioning 120 may estimate the motion of the movable object 110 based on the motion information 103 and may predict a pose of the movable object 110 at a current moment based on a previous pose of the movable object 110 at a previous moment. The positioning device 120 may extract the second set of visual features corresponding to the first set of visual features from the image 102, and may match the visual feature extracted from the image at the current moment with the visual feature corresponding to the current pose predicted from the visual feature map 101. Based on mapping between the visual features, the positioning device 120 may determine the pose of the movable object 110 during the motion, and may output a positioning result 104. For example, the positioning result 104 may be presented to a user (such as a driver of a transport tool indicated by the movable object 110), or may be used for path planning and/or control decision during the automatic driving of the autonomous vehicle.

Working principle of the positioning device 120 illustrated in FIG. 1 will be described in detail below with reference to the drawings.

Figure 2:
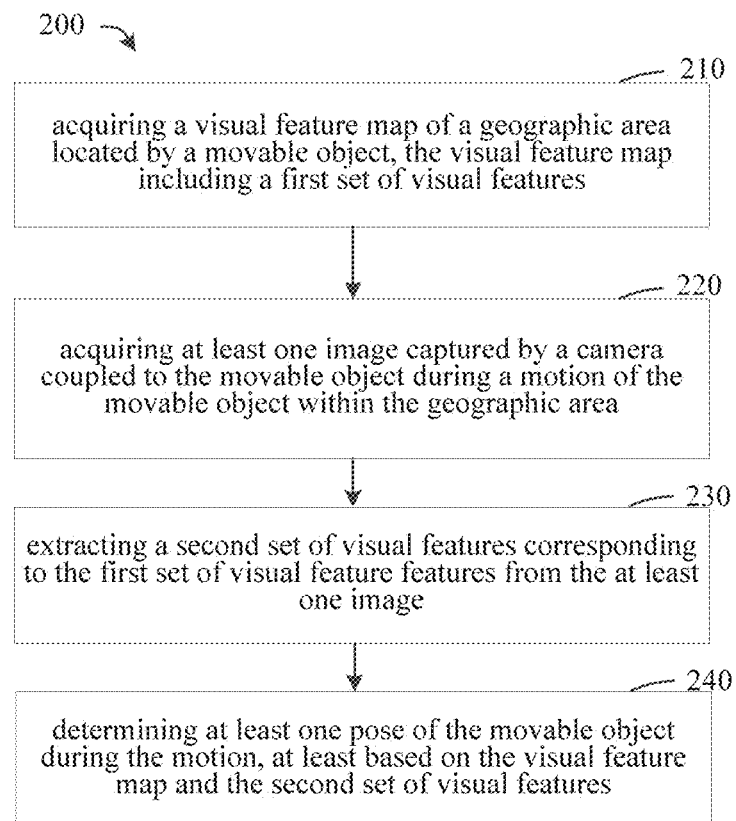
FIG. 2 is a flowchart illustrating an exemplary method for positioning according to embodiments of the present disclosure.

FIG. 2 is a flowchart illustrating an exemplary method 200 for positioning according to embodiments of the present disclosure. For example, the method 200 may be executed by the positioning device 120 illustrated in FIG. 1. Various acts of the method 200 may be described in detail in combination with FIG. 2. It should be understood that, the method 200 may further include additional acts which are not illustrated and/or omit some acts illustrated. The scope of the present disclosure is not limited in this respect.

At block 210, a visual feature map 101 of a geographic area located by a movable object 110 is acquired by the positioning device 120.

In some embodiments, the visual feature map 101 may be generated from a point cloud map, and may be stored in a storage device which is coupled to the positioning device 120 or is remoted from the positioning device 120 in the form of grid. The positioning device 120 may acquire the visual feature map 101 from the storage device.

Figure 3:
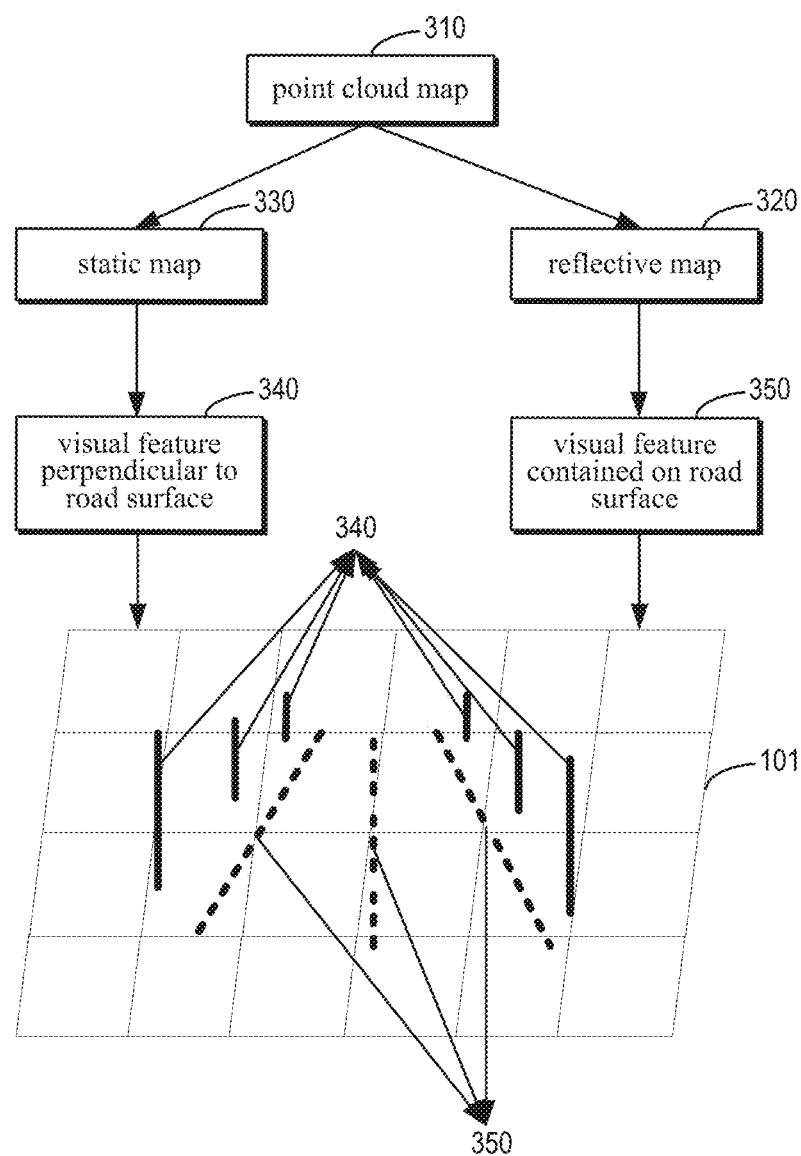
FIG. 3 is a schematic diagram illustrating a visual feature map according to embodiments of the present disclosure.

FIG. 3 is a schematic diagram illustrating a visual feature map 101 according to embodiments of the present disclosure. As illustrated in FIG. 3, the visual feature map 101 may be generated from the point cloud map 310. The point cloud map 310 may be a three-dimensional map regarding to the geographic area generated by scanning via radar. The point cloud map may be converted into a two-dimensional reflective map 320 through two-dimensional projection. In addition, the point cloud map 130 may be converted into a three-dimensional static map 330 by removing dynamic objects therefrom. In some embodiments, an automatic extraction algorithm may be applied to obtain the visual feature 340 (i.e., the first visual feature) perpendicular to the road surface from the static map 330, such as the streetlight, the wire pole, the traffic sign, or the like. Additionally or alternatively, the automatic extraction algorithm may be applied to obtain the visual feature 350 (i.e., the second visual feature) contained on the road surface from the reflective map 320, such as lane lines.

The first visual feature 340 extracted and/or the second visual feature 350 extracted may be represented in the visual feature map 101 in the form of solid line or dotted line. For example, in the visual feature map 101, positions and coordinates of starting points of line segments representing various visual features may be recorded. As illustrated in FIG. 3, the visual feature map 101 may be stored in the form of grid, for facilitating subsequent management and usage. For example, a cell of the grid may indicate a geographic region having a certain size (such as 128 meter×128 meter).

Although the visual feature map 101 including the first visual feature 340 perpendicular to the road surface and the second visual feature 350 contained on the road surface is illustrated in FIG. 3, it should be understood that, the above is merely for the purpose of example, and is not intended to limit the scope of the present disclosure. In some embodiments, it is possible that the visual feature map 101 may only include the first visual feature 340 perpendicular to the road surface, or may only include the second visual feature 350 contained on the road surface, or may include a combination thereof. In other embodiments, in addition to the first visual feature 340 and the second visual feature 350, the visual feature map 101 may further include other visual features, or may include any combination of various visual features. The scope of the present disclosure in this respect is not limited.

At block 220, at least one image 102 is acquired by the positioning device 120 via a camera 112 coupled to the movable object 110 while the movable object 110 is moving within the geographic area. For example, the positioning device 120 may acquire the at least one image 102 from the camera 112. The at least one image 102 may include a second set of visual features corresponding to the first set of visual features included in the visual feature map 101. At block 230, the second set of visual features corresponding to the first set of visual features is extracted from the at least one image 102 by the positioning device 120.

In some embodiments, the first set of visual features may include the first visual feature perpendicular to the road surface. The first visual feature may include columnar object perpendicular to the road surface, such as the streetlight, the wire pole, the traffic sign or the like. The positioning device 120 may extract a third visual feature corresponding to the first visual feature from the at least one image 102.

Additionally or alternatively, in other embodiments, the first set of visual features includes a combination of the first visual feature perpendicular to the road surface and the second visual feature contained on the road surface. The first visual feature includes the columnar object (such as the streetlight, the wire pole, the traffic sign and the like) perpendicular to the road surface, and the second visual feature includes the road marking lines (such as the lane line) contained on the road surface. The positioning device 120 may extract a third visual feature corresponding to the first visual feature and a fourth visual feature corresponding to the second visual feature from the at least one image 102.

In some embodiments, the extraction of the visual feature from the at least one image 102 may include an analytical process and a feature-fitting process. For example, the analytical process may perform pixel-level semantic segmentation of features in each of the at least one image 102 using a neural network, such as a convolutional neural network. The segmented image may have pixel values only at the pixels having features. The feature-fitting process may extract line features from analytical pixel front views using a Hough transform. The above descriptions are merely some examples of feature extraction of the image 102. It should be understood that, any existing or to-be-developed visual feature extraction algorithm may be used to extract the second set of visual features corresponding to the first set of visual features form the at least one image 102. The scope of the disclosure is not limited in this respect.

Figure 4:
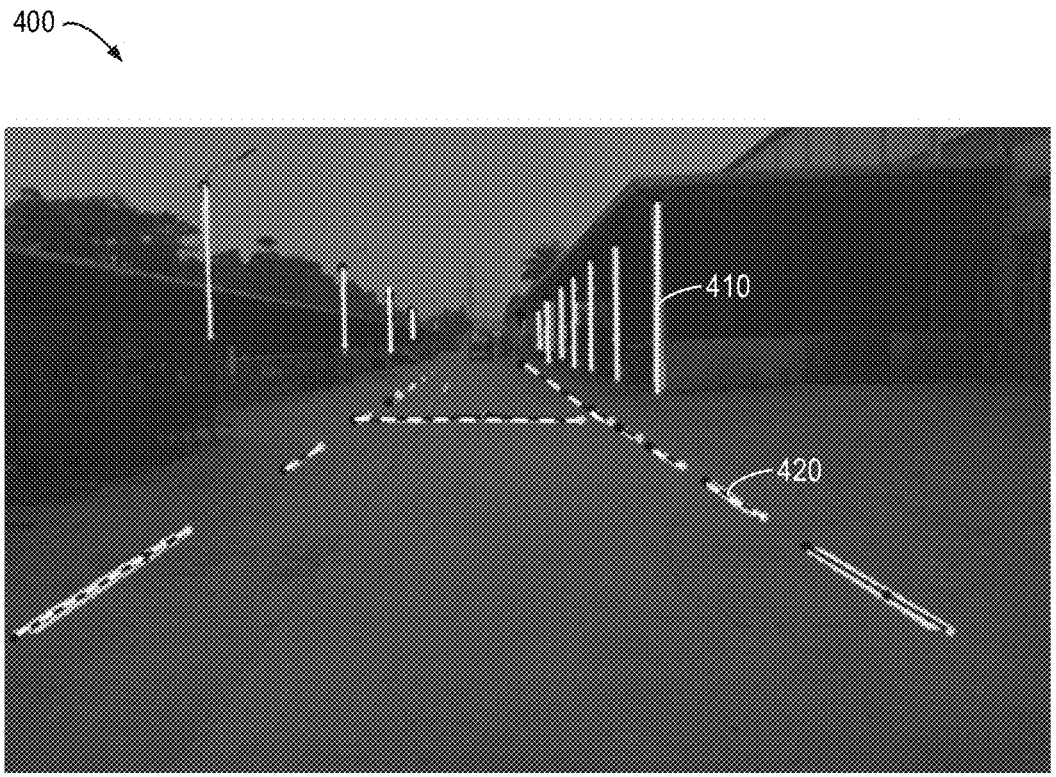
FIG. 4 is a schematic diagram illustrating visual features extracted from an image according to embodiments of the present disclosure.

FIG. 4 is a schematic diagram illustrating visual features extracted from one of at least one image 102 according to embodiments of the present disclosure. For example, the image 400 is one of the at least one image 102. In FIG. 4, the visual feature (such as the columnar object 410) perpendicular to the road surface extracted from the image 400 may be indicated by a white solid line, while the visual feature (such as the lane line 420) contained on the road surface extracted from the image 400 may be indicated by a white dotted line.

Returning back to FIG. 2, the method 200 proceeds to a block 240, where at least one pose of the movable object 110 is determined by the positioning device 120 during the motion of the movable object 110, based on the visual feature map 101 and the second set of visual features extracted from at least one image 102.

Figure 5:
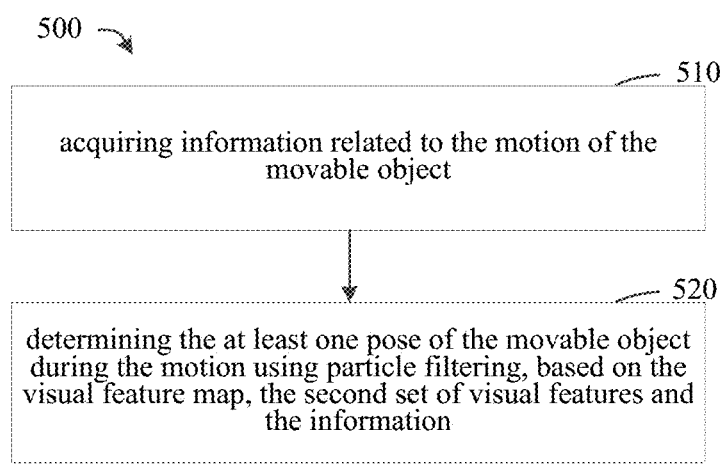
FIG. 5 is a flowchart illustrating an exemplary method for determining a pose of a movable object during motion according to embodiments of the present disclosure.

FIG. 5 is a flowchart illustrating a method 500 for determining the at least one pose of the movable object 110 during the motion according to embodiments of the present disclosure. For example, the method 500 may be considered as an implementation of the block 240 of the method 200 illustrated as FIG. 2. It should be understood that, the method 500 may further include additional acts which are not illustrated and/or may omit some acts illustrated. The scope of the present disclosure is not limited in this respect.

At block 510, information 103 related to motion of the movable object 110 is acquired by the positioning device 120. In some embodiments, the motion information 103 may be collected by a motion measurement device 111. For example, the motion measurement device 110 may include, but not limited to, an IMU (such as an accelerator, a gyroscope) and a velocity sensors (such as a wheel velocityometer). The motion information 130 may include, but not limited to, angular velocity, velocity (e.g. wheel velocity), accelerate of the movable object 110.

In block 520, a pose of the movable object 110 during the motion may be determined by the positioning device 120 using particle filtering, based on the visual feature map 101, the second set of visual features extracted from the image 102 and the motion information 103.

The visual features in the image 102 may be relatively sparse. For example, it is possible that there are only a few columnar objects or even no columnar object viewed from a single image, or the lane lines (such as, the adjacent lanes or the lanes indicated by the solid lines) may be duplicated on the map. In addition, matching among the columnar visual features or the line-shaped visual features is generally not linear. Therefore, it is difficult to establish a reliable viewing model. In some embodiments, the particle filtering may be used to solve the above problem and other potential problems. A basic principle of the particle filtering is to use a series of random samples to represent various possible states, and to approximately simulate a probability density distribution of the states by calculating a posterior probability of each sample.

Figure 6:
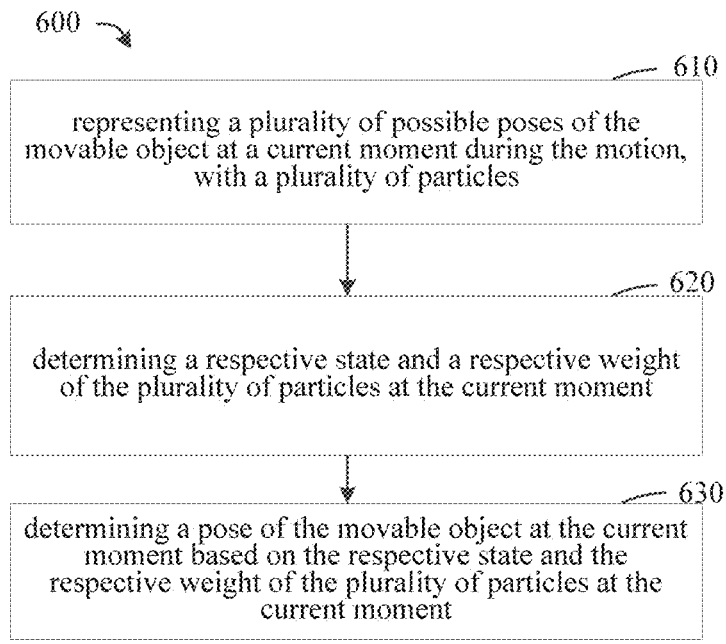
FIG. 6 is a flowchart illustrating an exemplary procedure of particle filtering according to embodiments of the present disclosure.

FIG. 6 is a flowchart illustrating an example procedure 600 of the particle filtering according to the embodiments of the present disclosure. For example, the procedure 600 may be considered as an implementation of the block 520 of the method 500 illustrated as FIG. 5. It should be understood that, the procedure 600 may further include additional acts which are not illustrated or may omit some illustrated acts. The scope of the present disclosure is not limited in this respect.

At block 610, a plurality of possible poses of the movable object 110 at a certain moment during the motion may be represented with a plurality of particles via the positioning device 120.

In some embodiments, at an initial moment, an initial pose of the movable object 110 may be determined using a GPS signal (or in other manners). Assuming that the initial state and covariance of the initial state of the moveable object 110 are known, K particles may be generated by randomly sampling K times near the initial state based on the covariance. Each state of the particle indicates a possible pose. Taking the pose in a two-dimensional coordinate system as an example, for example, the state of each particle may include a heading angle $\varphi$ and a position coordinate (x, y). For example, the initial state of a $i^{th}$ particle of the K particles may be denoted as $X_{0|0}^{i}$, where $1 \le i \le K$, and i denotes an index of that particle. In addition, each particle may be assigned with an initial weight, such as 1/K. The state and the weight of each particle may be updated over time.

Figure 7:
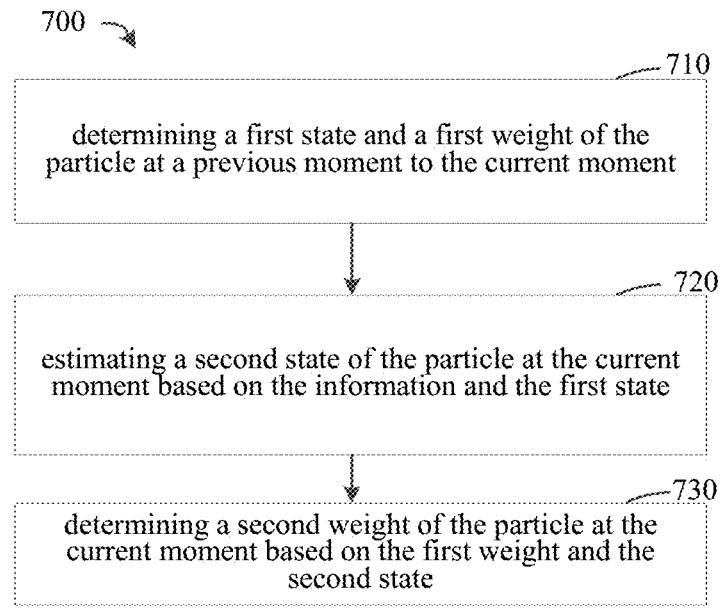
FIG. 7 is a flowchart illustrating an exemplary method for determining a respective status and a respective weight for a plurality of particles at a certain moment according to embodiments of the present disclosure.

At block 620, a respective state and a respective weight for the plurality of particles at the moment k may be determined by the positioning device 120. FIG. 7 is a flowchart illustrating a method 700 for determining a respective state and a respective weight for a plurality of particles at a moment k according to embodiments of the present disclosure. For example, the method 700 may be considered as an exemplary implementation of the block 620 of the procedure 600 as illustrated in FIG. 6. It should be understood that, the method 700 may further include additional acts which are not illustrated and/or may omit some illustrated acts. The scope of the present disclosure is not limited in this respect.

At block 710, for an $i^{th}$ particle of the K particles, a first state and a first weight for the particle at a previous moment k−1 to the moment k is determined by the positioning device 120. At block 720, a second state for the particle at the moment k is estimated by the positioning device 120 based on the motion information 103 and the first state.

In some embodiments, the second state of the particle at the current moment k may be estimated based on the motion model and the first state of the particle at the previous moment k−1 to the moment k. For example, the second state of the particle at the current moment k may be determined by the positioning device 120 based on a following formula:

$$X_{k|k-1}^i = \qquad \text{formula (1)}$$

$$X_{k-1|k-1}^i + \Delta X = \begin{bmatrix} \varphi_{k-1|k-1}^i + \Delta t \cdot \hat{\omega}^i \\ x_{k-1|k-1}^i + \Delta t \cdot \hat{v}^i \cdot \cos(\varphi_{k-1|k-1}^i + \Delta t \cdot \hat{\omega}^i) \\ y_{k-1|k-1}^i + \Delta t \cdot \hat{v}^i \cdot \sin(\varphi_{k-1|k-1}^i + \Delta t \cdot \hat{\omega}^i) \end{bmatrix}$$

where, $X_{k|k-1}^i$ denotes the state of the $i^{th}$ particle at the current moment k predicted based on the state at the moment k-1. $X_{k-1|k-1}^i$ denotes the state of the particle at the moment k-1. $\Delta X$ denotes a state change from the moment k-1 to the moment k. In the above formula (1), $\varphi_{k-1|k-1}^i$ denotes a heading angle of the particle at the moment k-1. $x_{k-1|k-1}^i$ denotes a horizontal ordinate of the particle at the moment k-1. $y_{k-1|k-1}^i$ denotes a longitudinal coordinate of the particle at the moment k. $\Delta t$ denotes a time interval from the moment k-1 to the moment k. $\hat{\omega}^i$ and $\hat{v}^i$ denotes an angular velocity and a velocity respectively, which are motion information 103 measured by a free motion measurement device 111.

In some embodiments, since there may be noise during the measurement process, Gaussian noise can be used for approximation. For example, $$\hat{\omega}^i = \omega_{gyro} + \varepsilon_{\sigma_{gyro}}^i$$

$$\hat{v}^i = v_{wheel} + \varepsilon_{\sigma_{wheel}}^i \qquad \text{formula (2)}$$

where, $\omega_{gyro}$ for example denotes the angular velocity measured by the IMU of the free motion measurement device 111. $v_{wheel}$ for example denotes the velocity measured by the wheel velocityometer of the free motion measurement device 111. $\varepsilon_{\sigma_{gyro}}^i$ and $\varepsilon_{\sigma_{wheel}}^i$ are samples of noise of the angular velocity and the velocity, respectively.

At block 730, a second weight of the particle at the moment k is determined by the positioning device 120 based on the first weight and the second state.

In some embodiments, after the update over time illustrated at the block 720, the predicted state $X_{k|k-1}^i$ of the particle i at the moment k may be determined. That is, a possible predicted pose of the movable object 110 may be determined. The positioning device 120 may project the visual feature included in the visual feature map 101 onto an image captured at the moment k via a coordinate transformation. A posterior probability of the particle may be updated by calculating a matching degree between the visual feature extracted from the image and the projected visual feature, thereby determining the second weight of the particle at the moment k.

For example, the second weight of the particle i at the moment k may be determined based on a following formula (3):

$$w_k^i = w_{k-1}^i P^i(z_k^i | x_{k|k-1}^i, m) \qquad \text{formula (3)}$$

where, $w_{k-1}^i$ denotes the first weight of the particle i at the moment k-1. $w_k^i$ denotes the second weight of the particle i at the moment k. $P^i(z_k^i | x_{k|k-1}^i, m)$ denotes a current probability of the particle calculated based on the matching degree. In some embodiments, in order to distinguish weights of the particles, Gaussian function can be used to fit the probability. That is, $$P^i(z_k^i | x_{k|k-1}^i, m) = e^{-\frac{(E_i - \mu)^2}{2\sigma^2}} \qquad (4)$$

where, the mean value $\mu = \min(E_i)$, and the variance $\sigma^2 = (\Sigma(E_i - \mu)^2)/K$. $E_i$ denotes the matching degree for the particle i. Details of determining $E_i$ may be described in detail with reference to FIG. 8.

Figure 8:
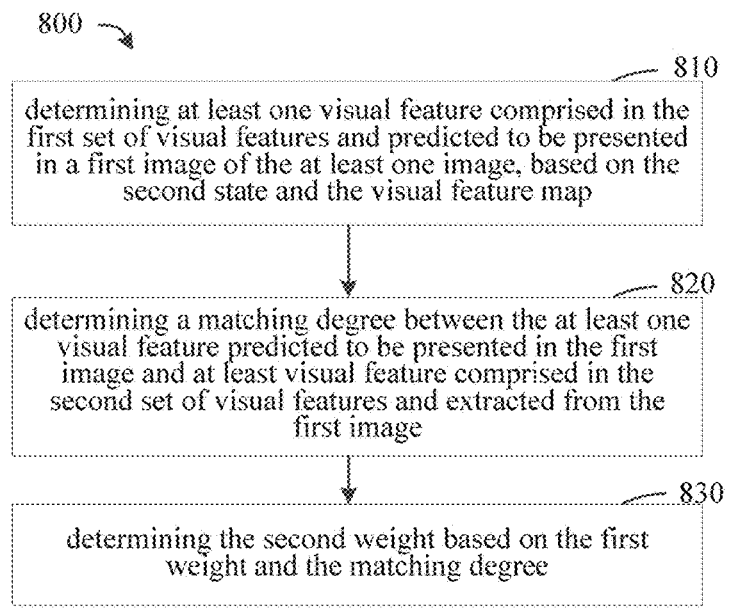
FIG. 8 is a flowchart illustrating an exemplary method for determining a weight for particles at a certain moment according to embodiments of the present disclosure.

FIG. 8 is a flowchart illustrating a method 800 for determining a second weight of the particle i at the moment k according to embodiments of the present disclosure. For example, the method 800 may be considered as an exemplary implementation of the block 730 in the method 700 as illustrated in FIG. 7. It should be understood that, the method 800 may further include additional acts which are not illustrated and/or may omit some illustrated acts. The scope of the present disclosure is not limited in this respect.

At block 810, at least one visual feature predicted to be presented in an image (also referred to as "a first image" throughout the specification) captured at the moment k may be determined by the positioning device 120 based on the second state of the particle at the current moment k and the visual feature map 101.

Figure 9A:
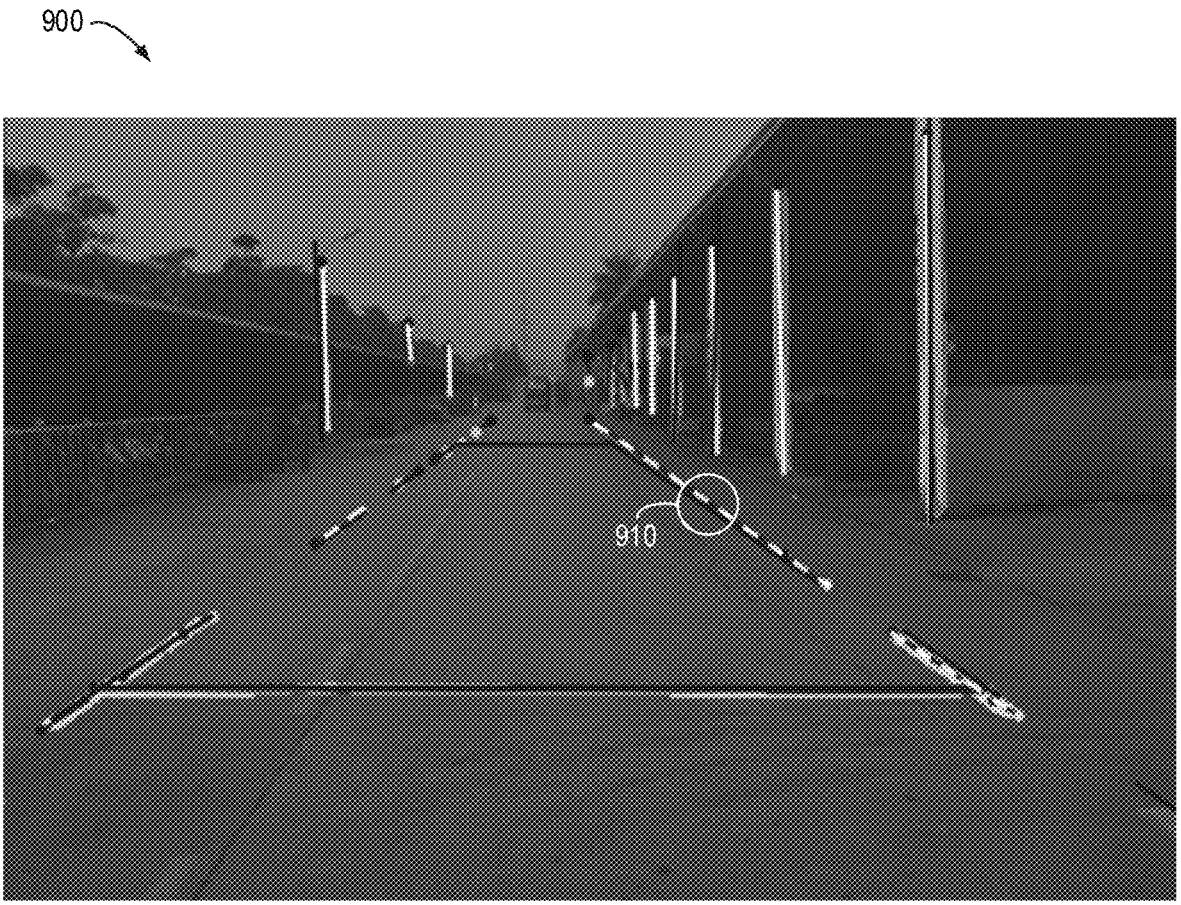
FIGS. 9A and 9B are schematic diagrams illustrating an image including visual features projected and an image including visual features extracted according to embodiments of the present disclosure respectively.

In some embodiments, the positioning device 120 may project the visual feature (such as the first visual feature and/or the second visual feature) included in the visual feature map 101 onto the first image captured at the moment k via the coordinate transformation, based on the predicted state $X_{k|k-1}^i$ of the particle i at the moment k. The visual feature included in the visual feature map 101 and projected onto the first image is the visual feature predicted to be presented in the first image. For example, FIG. 9A is a schematic diagram illustrating the first image 900 including the visual feature to be projected and the visual feature to be extracted according to embodiments of the present disclosure. As illustrated in FIG. 9A, the visual features (for example, including the visual feature perpendicular to the road surface and the visual feature contained on the road surface) extracted from the image 900 may be indicated by the white solid line and the white dotted line. In addition, as illustrated in FIG. 9A, the visual feature (for example the visual feature perpendicular to the road surface and the visual feature contained on the road surface) included in the visual feature map 101 and projected onto the first image 9A may be indicated by the black solid line.

At block 820, the matching degree between at least one visual feature predicted to be presented in the first image and at least one visual feature extracted from the first image is determined by the positioning device 120.

In order to describe how to determine the matching degree between the visual feature projected onto the first image and the visual feature extracted from the first image, FIG. 9A illustrates an exemplary area 910. As illustrated in FIG. 9A, in the exemplary area 910, not only the lane line projected onto the first image 900 is included, but also the lane line extracted from and originally presented in the first image 900 is included. For ease of illustration, FIG. 9B shows an enlarged view of the example area 910 of FIG. 9A.

Figure 9B:
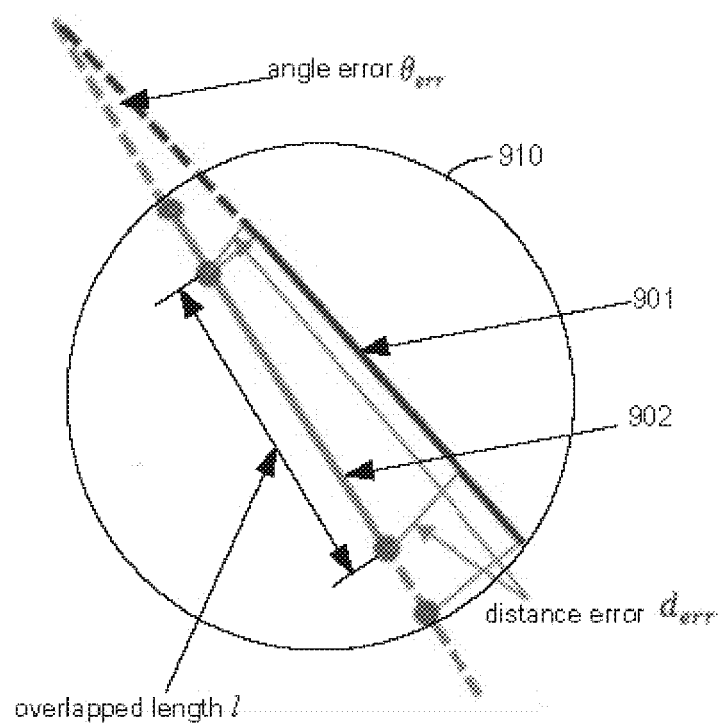

As illustrated in FIG. 9B, the exemplary area 910 includes the lane line feature 901 (denoted by a subscript of p in following formulas) extracted from and originally presented in the first image 900 and the lane line feature 902 projected onto the first image 900 from the visual feature map 101 (denoted by a subscript of q in following formulas). An error measure between the features 901 and the feature 902 may include following three parts: angle error $\theta_{err}$, distance error $d_{err}$ and overlapped length l. A final matching degree between the feature 901 and the feature 902 may be determined based on a following formula (5):

$$E_{pq}=l-d_{err}-\text{ratio}*l*\theta_{err} \quad \text{formula (5)}$$

where, $E_{pq}$ denotes the matching degree. The larger the $E_{pq}$, the higher the matching degree is. In the formula (5), ratio is a predetermined coefficient.

For example, a total number of features extracted from the first image is M, while a total number of features projected onto the first image from the visual feature map is N. In some embodiments, each of the M visual features extracted from the first image may be matched with a respective one projected, to determine a respective matching degree. In this way, a maximum value of $E_{pq}$ may be obtained, which may be considered as the matching degree for the feature p. That is, $$E_p=\max(E_{pq}), 1 \leq q \leq N \quad \text{formula (6)}$$

In some embodiments, considering that there may be occlusion of the columnar object and only a part thereof may be detected, the overlapped length l may be ignored when calculating the matching degree.

All matching degrees of features of the first image may be summed up, to obtain the matching degree of the particle i:

$$E_i = \Sigma_{p=1}^M E_p \quad \text{formula (7)}$$

At block 830, the second weight of the particle i at the moment k may be determined by the positioning device 120 based on the first weight of the particle i at the moment k−1 and the matching degree.

In some embodiments, for example, the positioning device 120 may determine the second weight $w_k^i$ of the particle i at the moment k based on the above formulas (3)-(7). In some embodiments, the weights of the particles may be normalized, such that the sum of all weights of the particles is 1.

In this way, the positioning device 120 may determine the respective state and the respective weight for the plurality of particles at the moment k.

Returning back to FIG. 6, the method 600 proceeds to a block 630, where the pose of the movable object 100 at the moment k may be determined by the positioning device 120 based on the respective state and the respective weight for the plurality of particles at the moment k.

In some embodiments, the positioning device 120 may cluster the particles according to a distribution state of all particles to divide the particles into multiple clusters. The positioning device 120 further determines a sum of weights of particles included in each cluster, to determine a cluster having a maximum sum of weights. Assuming that the cluster having the maximum sum of weights includes a set Φ of particles, the pose of the movable object 110 at the moment k may be determined as:

$$\hat{x}_{k|k} = \sum_{i \in \Phi} w_k^i x_{k|k-1}^i \quad \text{formula (8)}$$

In some embodiments, in the above particle filtering process, in order to avoid particle degradation (i.e., its probability becomes zero) such that the weight distribution is unbalanced, the particles may be re-sampled to ensure that the probabilities of most particles are within the effective range.

For example, when a following formula (9) is satisfied, the re-sampling is done:

$$\frac{1}{\sum_{i=1}^{K}(w_k^i)^2} < \frac{2}{3}K \quad \text{formula (9)}$$

where, K denotes the number of particles.

FIGS. 6-8 illustrates the particle filtering process according to embodiments of the present disclosure. As described above, the particle filtering may solve a problem that the visual feature is relatively sparse in the image 102. In some embodiments, the positioning device 120 may further apply additional processes to a result of the particle filtering. For example, the result of the particle filtering and the motion information 130 (for example, the information measured by IMU) may be provided to an extended Kalman filter, for further improving quality of a positioning result, for the sake of simplicity, which is not elaborated in the present disclosure.

In this way, embodiments of the present disclosure may overcome various problems existing in conventional positioning solutions. For example, embodiments of the present disclosure may achieve high-precision positioning in a scene where the GPS signal is poor, thereby satisfying a requirement of high-precision positioning of a L4 level autonomous vehicle at a lower cost.

Figure 10:
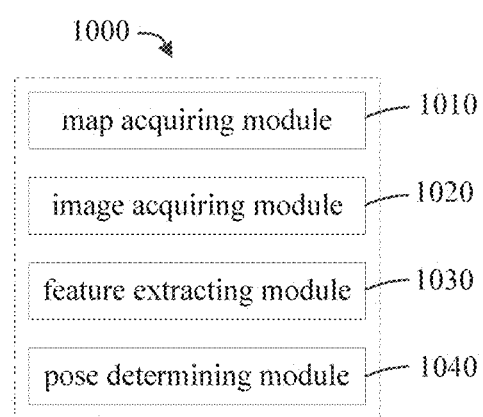
FIG. 10 is a schematic block diagram illustrating a device for positioning according to embodiments of the present disclosure.

FIG. 10 is a schematic block diagram illustrating a device 1000 for positioning according to embodiments of the present disclosure. As illustrated in FIG. 10, the device 100 may include a map acquiring module 1010, configured to acquire a visual feature map of a geographic area located by a movable object. The visual feature map includes a first set of visual features. The first set of visual features includes a first visual feature perpendicular to a road surface. The device 100 may further include an image acquiring module 1020, configured to acquire at least one image by a camera coupled the movable object while the movable object is moving within the geographic area. The device 100 may further include a feature extracting module 1030, configured to extract a second set of visual features corresponding to the first set of visual features from the at least one image. In addition, the device 100 may further include a pose determining module 1040, configured to determine at least one pose of the movable object during motion at least based on the visual feature map and the second set of visual features.

In some embodiments, the first set of visual features includes a columnar object perpendicular to the road surface of the geographic area.

In some embodiments, the first set of visual features further includes a second visual feature contained on the road surface of the geographic area.

In some embodiments, the second visual feature includes a road marking line contained on the road surface of the geographic area.

In some embodiments, the feature extracting module is further configured to extract a third visual feature corresponding to the first visual feature and a fourth visual feature corresponding to the second visual feature, from the at least one image. The pose determining module is further configured to determine at least one pose of the movable object during the motion at least based on the visual feature map, the third visual feature and the fourth visual feature.

In some embodiments, the pose determining module includes an information acquiring unit and a particle filtering unit. The information acquiring unit is configured to acquire information related to the motion of the movable object. The particle filtering unit is configured to determine the at least one pose of the movable object during the motion using the particle filtering based on the visual feature map, the second set of visual features and the information.

In some embodiments, the information acquiring unit is further configured to acquire the information from at least one of an inertial measurement unit coupled to the movable object and a velocity sensor coupled to the movable object.

In some embodiments, the information includes at least one of angular velocity and velocity of the movable object.

In some embodiments, the particle filtering unit is further configured to represent a plurality of possible poses of the movable object during the motion with the plurality of particles, to determine a respective state and a respective weight for the plurality of particles at a current moment, and to determine the pose of the movable object at the current moment based on the respective state and the respective weight for the plurality of particles at the current moment.

In some embodiments, the particle filtering unit is further configured to determine the respective state and the respective weight for the plurality of particles by following operations. For each of the plurality of particles, a first state and a first weight of the particle at a previous moment to the current moment are determined. Based on the information and the first state, a second state of the particle at the current moment is estimated. Based on the first weight and the second state, the second weight of the particle at the current moment is determined.

In some embodiments, the particle filtering unit is further configured to determine the second weight of the particle at the current moment by following operations. Based on the second state and the visual feature map, at least one visual feature included in the first set of visual features which is predicted to be presented in a first image of at least one image is determined. The first image is captured at the current time instant by a camera coupled to the movable object. A matching degree between the at least one visual feature predicted to be presented in the first image and at least one visual feature of the second set of visual features that is extracted from the first image is determined. Based on the first weight and the matching degree, the second weight is determined.

Figure 11:
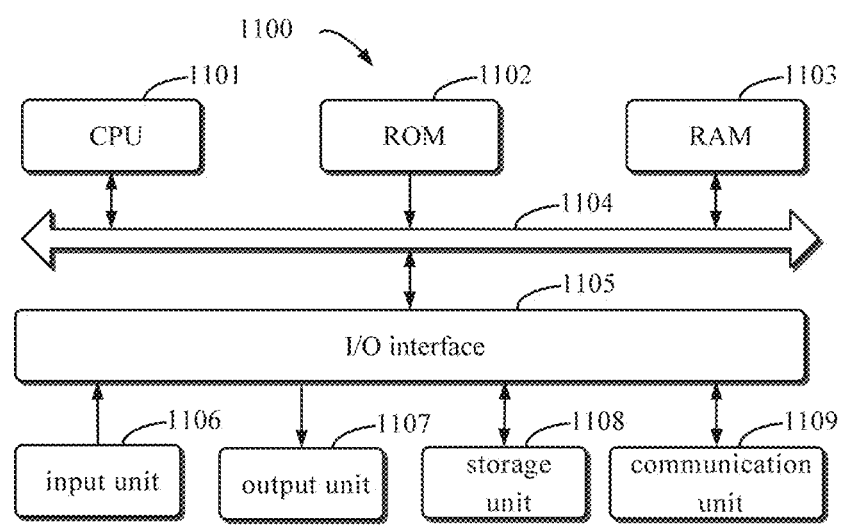
FIG. 11 is a block diagram illustrating a computing device for implementing embodiments of the present disclosure.

FIG. 11 is a schematic block diagram illustrating an exemplary device 1100 for implementing embodiments of the present disclosure. The device 1100 may be configured to implement the positioning device 120 as illustrated in FIG. 1. As illustrated in FIG. 11, the device 1100 includes a central processing unit (CPU) 1101. The CPU 1101 may be configured to execute various appreciate actions and processing according to computer program instructions stored in a read only memory (ROM) 1102 or computer program instructions loaded from a storage unit 1108 to a random access memory (RAM) 1103. In the RAM 1103, various programs and data required by the device 1100 may be further stored. The CPU 1101, the ROM 1102 and the RAM 1103 may be connected to each other via a bus 1104. An input/output (I/O) interface 505 is also connected to the bus 1104.

Components of the device 1100 are connected to the I/O interface 1105, including an input unit 1106, such as a keyboard, a mouse, etc.; an output unit 1107, such as various types of displays, loudspeakers, etc.; a storage unit 1108, such as a magnetic disk, a compact disk, etc.; and a communication unit 1109, such as a network card, a modem, a wireless communication transceiver, etc. The communication unit 1109 allows the device 1100 to exchange information/data with other devices through a computer network, such as Internet, and/or various telecommunication networks.

The various procedures and processing described above, such as method 200, 500, 600, 700 and/or 800, may be performed by the processing unit 1. For example, in some embodiments, the method 200, 500, 600, 700 and/or 800 can be implemented as a computer software program that is tangibly enclosed in a machine readable medium, such as the storage unit 1108. In some embodiments, some or all of the computer programs may be loaded and/or installed onto the device 1100 via the ROM 1102 and/or the communication unit 1109. When the computer programs are loaded to the RAM 1103 and are executed by the CPU 1101, one or more blocks of the method 200, 500, 600, 700 and/or 800 described above may be executed. Alternatively, in other embodiments, CPU 1101 may be configured to execute the method 200, 500, 600, 700 and/or 800 in other suitable manners, such as firmware.

Functions described above in the present disclosure may be performed at least in part by one or more hardware logic components. For example, and without limitation, examples of the hardware logic components may include: field programmable gate array (FPGA), application specific integrated circuit (ASIC), application specific standard product (ASSP), system on chip (SOC), load programmable logic device (CPLD) and the like.

Program codes for implementing the methods of the present disclosure may be written in any combination of one or more programming languages. These program codes may be provided to a general purpose computer, a special purpose computer or a processor or controller of other programmable data processing device, such that the program codes, when executed by the processor or controller, cause functions/operations specified in the flowcharts and/or block diagrams to be implemented. The program codes may be entirely executed on a machine, partly executed on the machine, partly executed on the machine as a software package, partly executed on a remote machine or entirely executed on the remote machine or one a server.

In context of the present disclosure, a machine readable medium may be a tangible medium which may contain or store programs for use by or in connection with an instruction execution system, apparatus, or device. The machine readable medium may be a machine readable signal medium or a machine readable storage medium. The machine readable medium may include, but not limited to, an electronic, magnetic, optical, electromagnetic, infrared, or semiconductor system, apparatus, or device, or any suitable combination thereof. More specific examples of the machine readable storage medium may include electrical connections based on one or more wires, portable computer disk, hard disk, random access memory (RAM), read only memory (ROM), an erasable programmable read only memory (EPROM or flash memory), optical fiber, compact disk read only memory (CD-ROM), optical storage device, magnetic storage device, or any suitable combination thereof.

In addition, although the operations are depicted in a particular order, this should be understood that the particular order illustrated or a sequence order is required to perform the operations, or all illustrated operations should be performed to achieve a desired result. Multitasking and parallel processing may be advantageous in certain circumstances. Likewise, although several specific implementation details are included in the above discussion, these should not be construed as limiting the scope of the present disclosure. Certain features described in context of separate embodiments can also be combined in a single implementation. Conversely, various features described in context of the single implementation can be implemented in a plurality of implementations, either individually or in any suitable subcombination.

Although the subject matter has been described in language specific to structural features and/or methodological acts, it should be understood that the subject matter defined in the appended claims is not necessarily limited to the specific features or acts described above. Instead, the specific features and acts described above are merely exemplary forms of implementing the claims.

What is claimed is:

1. A method for positioning, comprising:
   acquiring a visual feature map of a geographic area located by a movable object, the visual feature map comprising a first set of visual features, and the first set of visual features comprising a first visual feature perpendicular to a road surface of the geographic area;
   acquiring at least one image captured by a camera coupled to the movable object during a motion of the movable object within the geographic area;
   extracting a second set of visual features corresponding to the first set of visual features from the at least one image; and
   determining at least one pose of the movable object during the motion, at least based on the visual feature map and the second set of visual features;
   wherein determining the at least one pose of the movable object during the motion comprises:
      acquiring information related to the motion of the movable object and determining the at least one pose of the movable object during the motion using particle filtering, based on the visual feature map, the second set of visual features and the information;
   wherein determining the at least one pose of the movable object during the motion using the particle filtering comprises:
      representing a plurality of possible poses of the movable object at a current moment during the motion, with a plurality of particles; determining a respective state and a respective weight of the plurality of particles at the current moment and determining a pose of the movable object at the current moment based on the respective state and the respective weight of the plurality of particles at the current moment.

2. The method of claim 1, wherein the first visual feature comprises a columnar object perpendicular to the road surface of the geographic area.

3. The method of claim 1, wherein the first set of visual features further comprises a second visual feature contained on the road surface of the geographic area.

4. The method of claim 3, wherein the second visual feature comprises a road marking line contained on the road surface of the geographic area.

5. The method of claim 3, wherein,
   extracting the second set of visual features comprises:
      extracting a third visual feature corresponding to the first visual feature and a fourth visual feature corresponding to the second visual feature from the at least one image; and
   determining the at least one pose of the movable object during the motion comprises:
   determining the at least one pose of the movable object during the motion, at least based on the visual feature map, the third visual feature and the fourth visual feature.

6. The method of claim 1, wherein acquiring the information related to the motion of the movable object comprises:
   acquiring the information from at least one of an inertia measurement unit coupled to the movable object and a velocity sensor coupled to the movable object.

7. The method of claim 1, wherein the information comprises at least one of angular velocity and velocity of the movable object.

8. The method of claim 1, wherein determining the respective state and the respective weight of the plurality of particles at the current moment comprises:
   for one of the plurality of particles;
      determining a first state and a first weight of the particle at a previous moment to the current moment;
      estimating a second state of the particle at the current moment based on the information and the first state; and
      determining a second weight of the particle at the current moment based on the first weight and the second state.

9. The method of claim 8, wherein determining the second weight of the particle at the current moment comprises:
   determining at least one visual feature comprised in the first set of visual features and predicted to be presented in a first image of the at least one image, based on the second state and the visual feature map, the first image being captured by the camera coupled the movable object at the current moment;
   determining a matching degree between the at least one visual feature predicted to be presented in the first image and at least one visual feature comprised in the second set of visual features and extracted from the first image; and
   determining the second weight based on the first weight and the matching degree.

10. An electronic device, comprising:
    one or more processors; and
    a storage device, configured to store one or more programs, wherein when the one or more programs are executed by the one or more processors, the one or more processors are configured to:
    acquire a visual feature map of a geographic area located by a movable object, the visual feature map comprising a first set of visual features, and the first set of visual features comprising a first visual feature perpendicular to a road surface of the geographic area;
    acquire at least one image captured by a camera coupled to the movable object during a motion of the movable object within the geographic area;
    extract a second set of visual features corresponding to the first set of visual features from the at least one image; and
    determine at least one pose of the movable object during the motion, at least based on the visual feature map and the second set of visual features;
    wherein the one or more processors are configured to determine the at least one pose of the movable object during the motion by:
       acquiring information related to the motion of the movable object and determining the at least one pose of the movable object during the motion using particle filtering, based on the visual feature map, the second set of visual features and the information;
    wherein the one or more processors are configured to determine the at least one pose of the movable object during the motion using the particle filtering by:

representing a plurality of possible poses of the movable object at a current moment during the motion, with a plurality of particles; determining a respective state and a respective weight of the plurality of particles at the current moment and determining a pose of the movable object at the current moment based on the respective state and the respective weight of the plurality of particles at the current moment.

11. The electronic device of claim 10, wherein the first set visual features further comprises a second visual feature contained on the road surface of the geographic area.

12. The electronic device of claim 11, wherein the one or more processors are configured to extract the second set of visual features by extracting a third visual feature corresponding to the first visual feature and a fourth visual feature corresponding to the second visual feature from the at least one image; and the one or more processors are configured to determine the at least one pose of the movable object during the motion by determining the at least one pose of the movable object during the motion, at least based on the visual feature map, the third visual feature and the fourth visual feature.

13. The electronic device of claim 10, wherein the one or more processors are configured to acquire the information related to the motion of the movable object by:

acquiring the information from at least one of an inertia measurement unit coupled to the movable object and a velocity sensor coupled to the movable object.

14. The electronic device of claim 10, wherein the one or more processors are configured to determine the respective state and the respective weight of the plurality of particles at the current moment by:

for one of the plurality of particles;
determining a first state and a first weight of the particle at a previous moment to the current moment;
estimating a second state of the particle at the current moment based on the information and the first state; and
determining a second weight of the particle at the current moment based on the first weight and the second state.

15. The electronic device of claim 14, wherein the one or more processors are configured to determine the second weight of the particle at the current moment by:

determining at least one visual feature comprised in the first set of visual features and predicted to be presented in a first image of the at least one image, based on the second state and the visual feature map, the first image being captured by the camera coupled the movable object at the current moment;

determining a matching degree between the at least one visual feature predicted to be presented in the first image and at least one visual feature comprised in the second set of visual features and extracted from the first image; and determining the second weight based on the first weight and the matching degree.

16. A non-transitory computer readable storage medium, having computer programs stored thereon, wherein when the computer programs are executed by a processor, the processor is configured to execute a method for positioning, the method comprising:

acquiring a visual feature map of a geographic area located by a movable object, the visual feature map comprising a first set of visual features, and the first set of visual features comprising a first visual feature perpendicular to a road surface of the geographic area;

acquiring at least one image captured by a camera coupled to the movable object during a motion of the movable object within the geographic area;

extracting a second set of visual features corresponding to the first set of visual features from the at least one image; and determining at least one pose of the movable object during the motion, at least based on the visual feature map and the second set of visual features;

wherein determining the at least one pose of the movable object during the motion comprises:
acquiring information related to the motion of the movable object and determining the at least one pose of the movable object during the motion using particle filtering, based on the visual feature map, the second set of visual features and the information;

wherein determining the at least one pose of the movable object during the motion using the particle filtering comprises:

representing a plurality of possible poses of the movable object at a current moment during the motion, with a plurality of particles; determining a respective state and a respective weight of the plurality of particles at the current moment and determining a pose of the movable object at the current moment based on the respective state and the respective weight of the plurality of particles at the current moment.

* * * * *